US012671529B2

(12) United States Patent
Baek et al.

(10) Patent No.:  US 12,671,529 B2
(45) Date of Patent:  Jun. 30, 2026

(54) METHOD AND DEVICE FOR CONFIGURING AVAILABLE HARQ PROCESS OF LOGICAL CHANNEL

(71) Applicant: Samsung Electronics Co., Ltd., Suwon-si (KR)

(72) Inventors: Sangkyu Baek, Suwon-si (KR); Nishithkumar Dhananjay Tripathi, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 241 days.

(21) Appl. No.: 18/261,420

(22) PCT Filed: Jan. 13, 2022

(86) PCT No.: PCT/KR2022/000685
§ 371 (c)(1),
(2) Date: Jul. 13, 2023

(87) PCT Pub. No.: WO2022/154543
PCT Pub. Date: Jul. 21, 2022

(65) Prior Publication Data
US 2024/0072944 A1    Feb. 29, 2024

Related U.S. Application Data

(60) Provisional application No. 63/137,607, filed on Jan. 14, 2021.

(51) Int. Cl.
H04L 1/1867     (2023.01)
H04L 1/1812     (2023.01)
H04W 72/232     (2023.01)

(52) U.S. Cl.
CPC .......... H04L 1/1887 (2013.01); H04L 1/1812 (2013.01); H04W 72/232 (2023.01)

(58) Field of Classification Search
CPC ... H04L 1/1887; H04L 1/1812; H04W 72/232
See application file for complete search history.

(56) References Cited

U.S. PATENT DOCUMENTS

| | | | |
|---|---|---|---|
| 10,924,223 B2 | 2/2021 | Ye | |
| 12,119,937 B2 * | 10/2024 | Narayanan Thangaraj | .................. H04W 72/23 |
| 2021/0385020 A1 | 12/2021 | Maattanen et al. | |
| 2022/0408430 A1 | 12/2022 | Baek et al. | |

FOREIGN PATENT DOCUMENTS

| | | |
|---|---|---|
| KR | 10-2020-0103790 A | 9/2020 |
| WO | 2020089858 A1 | 5/2020 |

(Continued)

OTHER PUBLICATIONS

Supplementary European Search Report dated May 17, 2024, in connection with European Patent Application No. 22739736.1, 9 pages.

(Continued)

*Primary Examiner* — Chandrahas B Patel

(57) ABSTRACT

The present disclosure relates to a 5G or 6G communication system for supporting higher data transmission rates. According to an embodiment of the present disclosure, a method performed by a terminal in a communication system is provided. The method performed by the terminal comprises the steps of: receiving, from a base station, logical channel configuration information that includes first information about an available hybrid automatic repeat request (HARQ) mode corresponding to a logical channel, and serving cell configuration information that includes second information about an available HARQ mode for each HARQ process ID; performing a logical channel prioritization procedure on the basis of the first information and the second (Continued)

information; and transmitting uplink data to the base station on the basis of the result of the logical channel prioritization procedure.

16 Claims, 11 Drawing Sheets

(56) References Cited

FOREIGN PATENT DOCUMENTS

| WO | 2020193609 A1 | 10/2020 |
|---|---|---|
| WO | 2020223453 A2 | 11/2020 |
| WO | 2021101179 A1 | 5/2021 |

OTHER PUBLICATIONS

International Search Report and Written Opinion of the International Searching Authority dated Apr. 26, 2022, in connection with International Application No. PCT/KR2022/000685, 9 pages.

Ericsson, "Harmonizing UL CG enhancements in NR-U and URLLC," R2-2008881, 3GPP TSG-RAN WG2 #112-e, Electronic, Nov. 2-13, 2020, 6 pages.

Communication pursuant to Article 94(3) EPC dated Mar. 3, 2026, in connection with European Patent Application No. 22739736.1, 6 pages.

Office Action dated Mar. 4, 2026, in connection with Korean Patent Application No. 10-2023-7024131, 12 pages.

Notification of the First Office Action dated Mar. 27, 2026, in connection with Chinese Patent Application No. 202280010123.6, 11 pages.

Nokia, "Discussion on LCP procedure for NTN," R2-1913388, 3GPP TSG-RAN WG2 Meeting #107bis, Chongqing, China, Oct. 14-18, 2019, 5 pages.

Oppo, "Harq impact on MAC procedures in NTN," R2-2009108, 3GPP TSG-RAN WG2 Meeting #112 electronic, online, Nov. 2-13, 2020, 5 pages.

Ericsson, "Introduction of Dual Cell E-DCH mode of operation," R3-093238, 3GPP TSG-RAN3 Meeting #66, Jeju Island, South Korea, Nov. 9-13, 2009, 639 pages.

* cited by examiner

Figure 6:
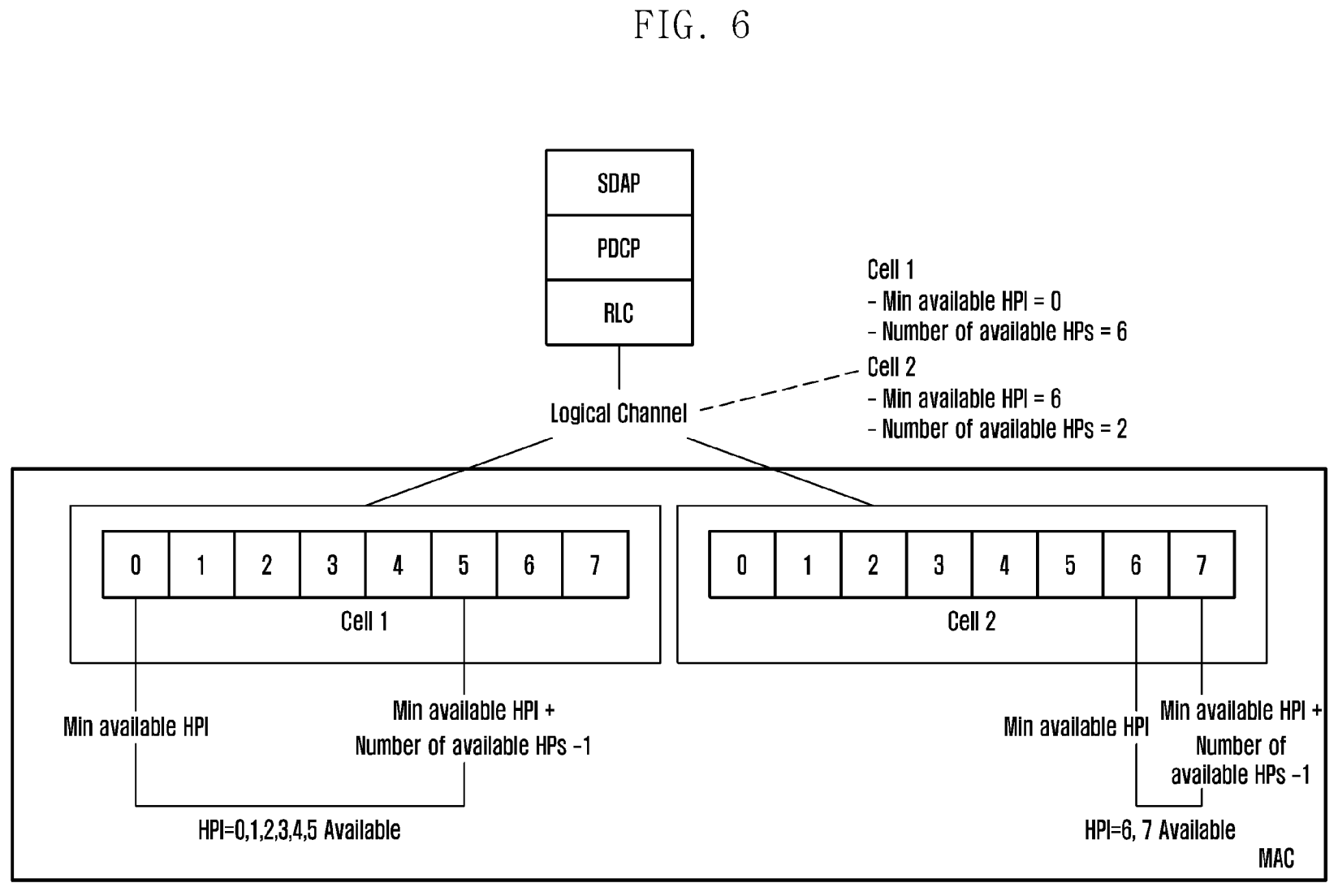

SDAP

PDCP

RLC

Logical Channel

Cell 1
- Min available HPI = 0
- Number of available HPs = 6

Cell 2
- Min available HPI = 6
- Number of available HPs = 2

MAC

Cell 1

| 0 | 1 | 2 | 3 | 4 | 5 | 6 | 7 |

Min available HPI

Min available HPI +
Number of available HPs −1

HPI=0,1,2,3,4,5 Available

Cell 2

| 0 | 1 | 2 | 3 | 4 | 5 | 6 | 7 |

Min available HPI

Min available HPI +
Number of available HPs −1

HPI=6,7 Available

METHOD AND DEVICE FOR CONFIGURING AVAILABLE HARQ PROCESS OF LOGICAL CHANNEL

TECHNICAL FIELD

The disclosure relates to operations of a terminal and a base station in a mobile communication system. More specifically, the disclosure relates to operations of a terminal and a base station related to a hybrid automatic repeat request (HARQ) process in a mobile communication system.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, TAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Various embodiments of the disclosure are to provide a method for configuring an available HARQ process of a logical channel, and a device capable of performing the same.

Solution to Problem

According to an embodiment of the disclosure, a method of a terminal in a communication system is provided. The method of the terminal includes: receiving, from a base station, logical channel configuration information that includes first information about an available hybrid automatic repeat request (HARQ) mode corresponding to a logical channel, and serving cell configuration information that includes second information about an available HARQ mode for each HARQ process ID; performing a logical channel prioritization procedure, based on the first information and the second information; and transmitting uplink data to the base station, based on a result of the logical channel prioritization procedure.

According to an embodiment of the disclosure, a method of a base station in a communication system is provided. The method of the base station includes: transmitting, to a terminal, logical channel configuration information that includes first information about an available HARQ mode corresponding to a logical channel, and serving cell configuration information that includes second information about an available HARQ mode for each HARQ process ID; and receiving uplink data from the terminal, wherein the first information and the second information are used for a logical channel prioritization procedure, and the uplink data is based on a result of the logical channel prioritization procedure.

According to an embodiment of the disclosure, a terminal of a communication system is provided. The terminal includes: a transceiver; and a controller connected to the transceiver and configured to receive, from a base station, logical channel configuration information that includes first information about an available HARQ mode corresponding to a logical channel, and serving cell configuration information that includes second information about an available HARQ mode for each HARQ process ID, perform a logical channel prioritization procedure, based on the first information and the second information, and transmit uplink data to the base station, based on a result of the logical channel prioritization procedure.

According to an embodiment of the disclosure, a base station of a communication system is provided. The base station includes: a transceiver; and a controller connected to the transceiver and configured to transmit, to a terminal, logical channel configuration information that includes first information about an available HARQ mode corresponding to a logical channel, and serving cell configuration information that includes second information about an available HARQ mode for each HARQ process ID, and receive uplink data from the terminal, wherein the first information and the second information are used for a logical channel prioritization procedure, and the uplink data is based on a result of the logical channel prioritization procedure.

Advantageous Effects of Invention

According to various embodiments of the disclosure, a method for configuring an available HARQ process of a logical channel, and a device capable of performing the same are provided.

According to an embodiment of the disclosure, a terminal may receive a configuration of an available (allowed) HARQ process for each logical channel, and data may be transmitted through the available HARQ process in each logical channel. In addition, retransmissions of the data may be performed as long as a delay requirement is satisfied. Accordingly, communication can be efficiently performed even in a communication system having a long propagation delay, such as a non-terrestrial network (NTN).

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

The above and other objects, features, and advantages of the disclosure will become more apparent through the following description of embodiments of the disclosure with reference to the accompanying drawings.

FIG. 3 illustrates a method for applying a logical channel prioritization (LCP) restriction according to an embodiment of the disclosure;

FIG. 4 illustrates a method for applying an LCP restriction according to an embodiment of the disclosure;

FIG. 5 illustrates a method for applying an LCP restriction according to an embodiment of the disclosure;

FIG. 6 illustrates a method for applying an LCP restriction according to an embodiment of the disclosure;

MODE FOR THE INVENTION

Figure 1:
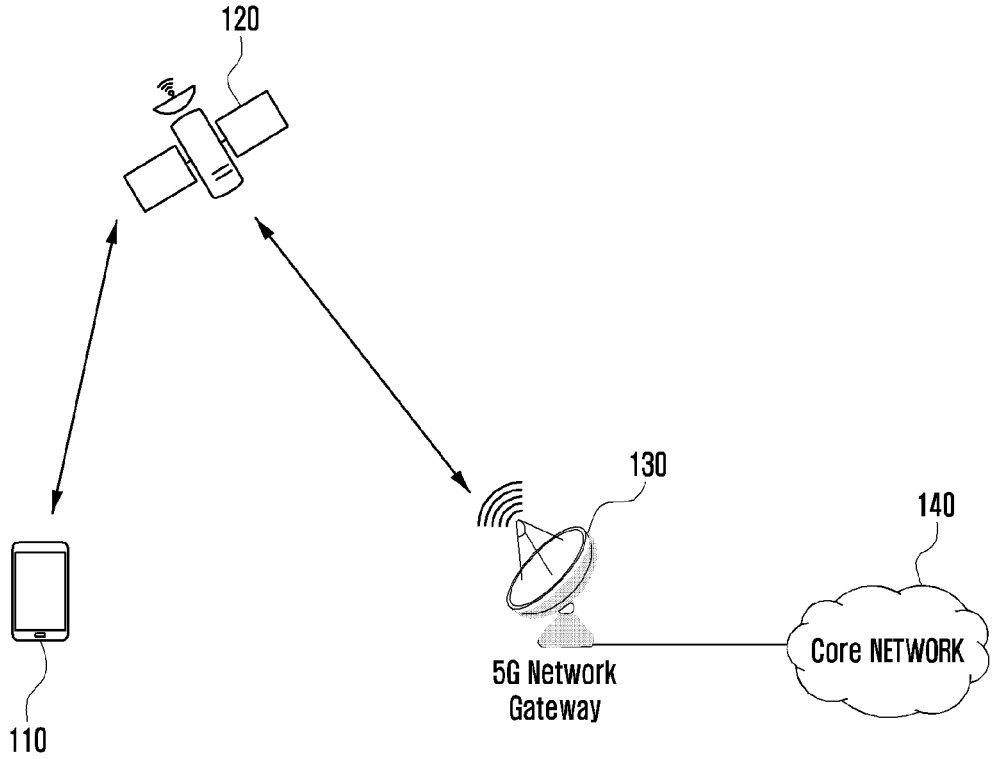
FIG. 1 illustrates a structure of an NTN according to an embodiment of the disclosure.

Hereinafter, embodiments of the disclosure will be described in detail with reference to the accompanying drawings. In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

Hereinafter, a method and a device proposed in an embodiment of the disclosure are not limited to each embodiment, and may be applied using a combination of all or some of one or more embodiments proposed in the disclosure. In addition, an embodiment of the disclosure may be applied through some modifications within a range which does not significantly depart from the scope of the disclosure, as determined by a person having skilled technical knowledge.

Hereinafter, with reference to FIGS. 1 to 11, a method proposed in the disclosure and a device capable of performing the method will be described in detail.

FIG. 1 illustrates a structure of a non-terrestrial network (NTN) according to an embodiment of the disclosure.

Referring to FIG. 1, in a $5^{th}$ generation mobile communication (5G) system, when a mobile communication terminal 110 is not in the coverage of a base station located on the ground or it is difficult for a base station located on the ground to provide a communication service, the terminal 110 may perform communication with a satellite base station 120. A network which provides a communication service through an artificial satellite not located on the ground may be referred to as a non-terrestrial network (NTN). In the NTN, the satellite 120 may serve as a base station independently or may serve to relay a signal of a 5G network gateway 130 which serves as a base station on the ground, and the actual role of the satellite may vary depending on a structure of the NTN. The 5G network gateway 130 may be connected to a core network 140 and may transfer data from the core network and an external network to the terminal, or transfer data from the terminal to the core network and the external network. The satellite 120 used in the NTN should be equipped with a 5G communication modem to enable wireless communication with the terminal, and in this case, may be referred to as a satellite base station. Since such an artificial satellite is separated from the ground by thousands of kilometers (km) to tens of thousands of kilometers, radio waves transmitted between the terminal 110 and the satellite 120 may have a longer propagation delay than a terrestrial network (TN). If it is necessary to exchange a message between the terminal 110 and the satellite base station 120, a round trip time (RTT) is required as much as the sum of a propagation delay from the terminal 110 to the satellite base station 120 and a propagation delay from the satellite base station 120 to the terminal 110, and in the NTN, a large RTT may cause degradation of service quality. Therefore, in order to provide a service having a short delay requirement in the NTN, it is necessary to devise a method capable of transmitting data corresponding to such a service by minimizing a propagation delay or round trip time.

Figure 2:
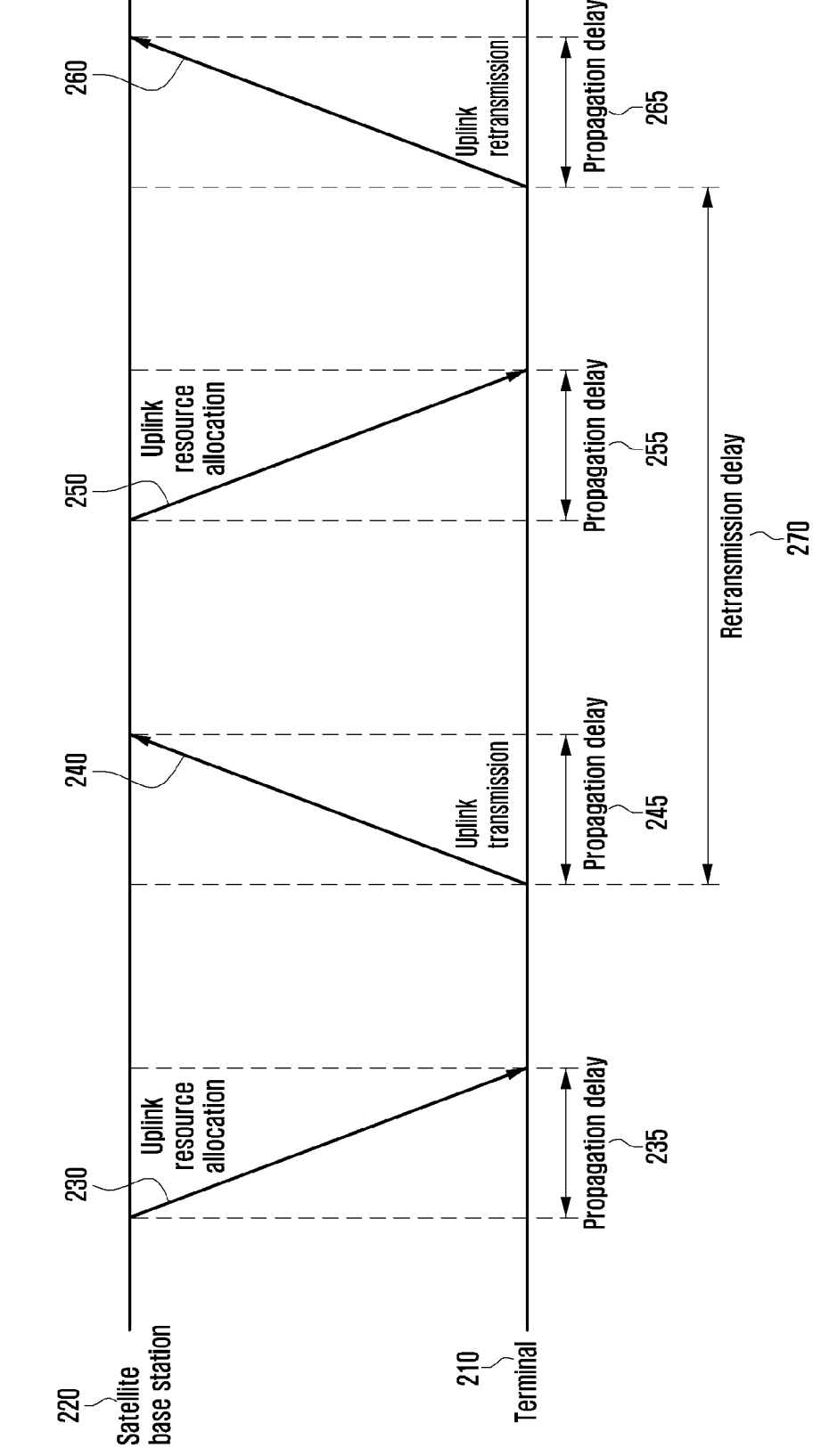
FIG. 2 illustrates an example of occurrence of a retransmission delay at the time of uplink retransmission in an NTN according to an embodiment of the disclosure.

FIG. 2 illustrates an example of occurrence of a retransmission delay at the time of uplink retransmission in an NTN according to an embodiment of the disclosure.

In the disclosure, an uplink refers to a radio link transmitted by a terminal 210 to a base station. In an NTN, a radio link directed from the terminal 210 to a satellite base station

220 or a radio link directed from the terminal 210 via the satellite base station 220 to a 5G network gateway connected to the satellite base station 220 and serving as a base station may be referred to as an uplink.

In order to transmit uplink data, first, the satellite base station 220 may allocate a resource (an uplink resource (uplink grant)) which can be transmitted via an uplink to the terminal 210 (230). According to an embodiment, the base station 220 may transmit uplink resource allocation information to the terminal 210 through a downlink control information (DCI) format of a physical downlink control channel (PDCCH). The terminal 210 having decoded the content of the received DCI can be aware of a location and detailed information of a radio resource where actual uplink transmission is to occur. The terminal 210 receives the uplink resource allocation information 230 at a time point at which a propagation delay 235 has elapsed from when the base station 220 transmits the uplink resource allocation information to the terminal 210. Thereafter, the terminal 210 may transmit uplink data to the satellite base station 220 (240). The satellite base station 220 receives the uplink data at a time point at which a propagation delay 245 has elapsed from when the terminal 210 transmits the uplink data. If the base station 220 has not successfully received uplink transmission, the base station 220 may allocate an uplink resource for retransmission (250). The base station 220 may also transmit allocation information of an uplink resource for retransmission to the terminal 210 via a DCI format of a PDCCH, and the terminal 210 having decoded the content of the received DCI can be aware of a location and detailed information of a radio resource where actual uplink transmission is to occur. The terminal 210 receives uplink resource allocation information 250 at a time point at which a propagation delay 255 has elapsed from when the satellite base station 220 transmits the uplink resource allocation information to the terminal 210. Thereafter, the terminal 210 may transmit uplink data corresponding to retransmission to the satellite base station 220 (260). The satellite base station 220 receives the uplink data at a time point at which a propagation delay 265 has elapsed from when the terminal 210 transmits the uplink data. As shown in FIG. 2, in the NTN, due to the long propagation delays 235, 245, 255, and 265, a retransmission delay 270 including the propagation delay also becomes long. In the disclosure, the retransmission delay may also be referred to as a retransmission round trip time (RTT). As such, in the NTN, the retransmission delay becomes long due to the long propagation delay, and according to the long retransmission delay, it is difficult to provide data having a short delay requirement, which may result in performance degradation. It may be unnecessary for the terminal to perform retransmission by allocating an uplink radio resource for retransmission by the base station in terms of delay requirements. For example, when the time required for uplink retransmission is too long to satisfy the delay requirement, retransmission may not be performed or the number of retransmissions may be reduced with respect to a specific uplink transmission. Since such uplink retransmission is performed for each HARQ process in an HARQ procedure, the base station may configure, in the terminal, whether to perform uplink retransmission for each HARQ process. In addition, a configuration message for whether to perform such uplink retransmission may be transmitted in a medium access control-control element (MAC CE) format or a downlink control information (DCI) format. The above-described MAC CE and DCI are only examples, and the disclosure is not limited thereto.

Although uplink transmission between the satellite base station and the terminal is taken as an example in FIG. 2, this is only for convenience of description, and the disclosure is not limited thereto. Even when the satellite base station is replaced with a 5G network gateway, a propagation delay is changed to the sum of a propagation delay between the satellite base station and the terminal and a propagation delay between the satellite base station and the 5G network gateway, but the phenomenon of increasing the retransmission delay may be explained in the same manner.

Figure 3:
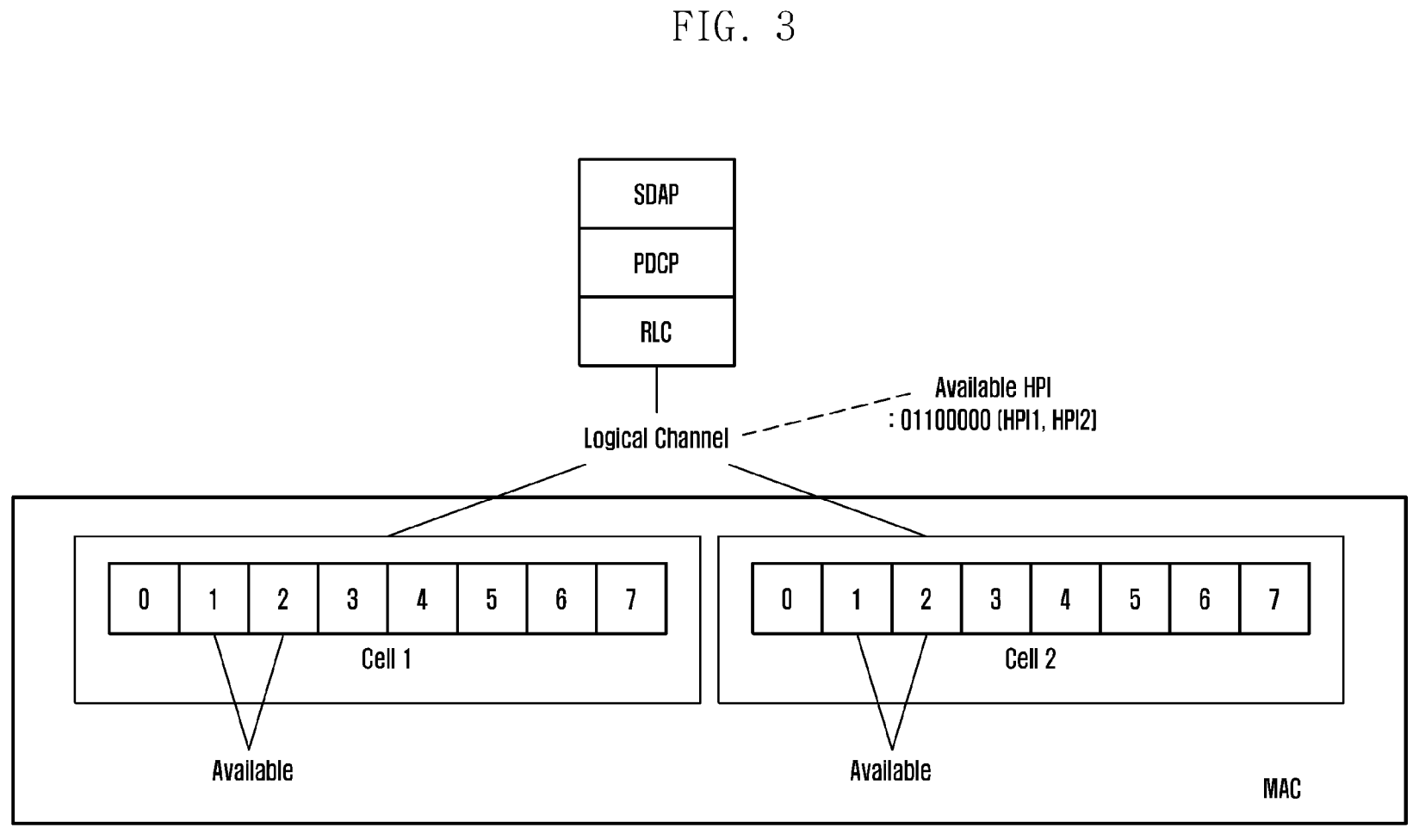

FIG. 3 illustrates a method for applying a logical channel prioritization (LCP) restriction according to an embodiment of the disclosure.

In a mobile communication system to which the disclosure may be applied, a radio bearer may be divided into a control signal radio bearer (signaling radio bearer (SRB)) for transmitting control information such as a radio resource control (RRC) message or a non-access stratum (NAS) message, a data radio bearer for transmitting user data, and the like. In addition, the radio bearer may have service data adaptation protocol (SDAP), packet data convergence protocol (PDCP), and radio link control (RLC) layer devices (entities). The SRB may not have an SDAP device. Each RLC device of the radio bearer may correspond to a MAC device, and the MAC device transmits data in one or more cells. One cell may have several hybrid automatic repeat request (HARQ) processes, and the MAC device may transmit or receive a packet for each HARQ process. Referring to FIG. 3, it is shown that, in the embodiment of FIG. 3, cell 1 and cell 2 each have 8 HARQ processes, and each of the HARQ processes has an HARQ process ID (HPI) from 0 to 7. This is only an assumption for convenience of description, and the disclosure is not limited thereto. That is, the number of HARQ processes that each cell has may vary depending on a communication system or a terminal. In addition, different pieces of configuration information may be configured for each radio bearer according to requirements such as a delay and reliability of information transmitted by the radio bearer.

As described above in FIG. 2, since a retransmission delay becomes long in a communication system having a long propagation delay, such as an NTN, performing multiple retransmissions may increase the delay of the information transmitted by the radio bearer. If the information transmitted by the radio bearer requires a short delay, multiple retransmissions already exceed the delay requirement, and thus at the time of receiving the information, the information may amount to information that is no longer needed. On the other hand, when information transmitted by a predetermined radio bearer is valid even in spite of a long delay, multiple retransmissions may be performed to increase the reliability. In such a communication system having a long propagation delay, data transmission may be performed by adjusting the number of retransmissions according to the delay requirement. However, in the case of uplink transmission, the terminal cannot be aware of the number of uplink transmissions configured by a base station. Therefore, the terminal cannot adjust the number of retransmissions or determine whether to perform data transmission according to the number of retransmissions. If the base station determines the number of retransmissions for each HARQ process to be used, and the terminal can receive a configuration of an available (allowed) HARQ process for each logical channel from the base station, data may be transmitted through an available HARQ process for each logical channel, and retransmissions of the transmitted data may be performed as long as the delay requirement is satisfied.

To this end, in the embodiment of FIG. 3, a method for configuring an available HARQ process for each logical channel applied by a MAC device is described. A list of available (allowed) HARQ processes (for example, may refer to allowedHARQProcess-List) may be included in a logical channel configuration in an RRC message transmitted by the base station to the terminal. In this case, in order to allow data to be transmitted only through an uplink radio resource (uplink grant) of an HARQ process ID included in the list of available HARQ processes with respect to a corresponding logical channel, the terminal may perform a logical channel prioritization operation. After performing the logical channel prioritization operation, the terminal may perform uplink transmission by including, in an uplink radio resource, data for a logical channel that ensures a size of resources by which the data can be transmitted.

The embodiment of FIG. 3 shows a method for configuring one list of available (allowed) HARQ processes in one MAC device. Each cell has an HARQ process ID from 0 (the number of HARQ processes in a cell) to −1, and the ID value may be unique only in a corresponding cell. Therefore, when an available HARQ process is configured in a MAC device, an ID of the available HARQ process may be commonly applied to HARQ processes of cells connected to (or within a cell group) all MAC devices. Accordingly, in the case of carrier aggregation in which multiple cells are configured, an available HARQ process commonly applied in all cells in the MAC device may be configured, and thus an increase in configuration overhead can be prevented. In relation to a logical channel of the embodiment of FIG. 3, it is shown that available HARQ processes are HARQ processes with HPI=1 and HPI=2. Therefore, with respect to the logical channel, uplink transmission may be performed using uplink radio resources of HARQ processes corresponding to HPI=1 and HPI=2 of all cells connected to (or within a cell group) the MAC device. According to another embodiment, when a list of available HARQ processes of a logical channel is not configured, all configured HARQ processes may be used for the logical channel.

The embodiment of FIG. 3 shows an embodiment in which a list of available HARQ processes is expressed in the form of a bitmap having a maximum value size of the number of HARQ processes configured in a cell. That is, since each cell has 8 HARQ processes, the list of available HARQ processes may be expressed as an 8-bit bitmap, and in the case where a value of n (0<=n<=(the number of HARQ processes in a cell)−1)th bit is 1, the case may mean that an HARQ process corresponding to HARQ process ID=n can be used. Conversely, in the case where the value of the n (0<=n (the number of HARQ processes in a cell)−1)th bit is 0, the case may mean that the HARQ process corresponding to HARQ process ID=n cannot be used.

In another embodiment of the disclosure, instead of such a bitmap, a list of HARQ process IDs available in all cells connected to (or within a cell group) a MAC device may be included. For example, in the case of the embodiment of FIGS. 3, 1 and 2 may be included in a list of available HARQ processes.

Figure 4:
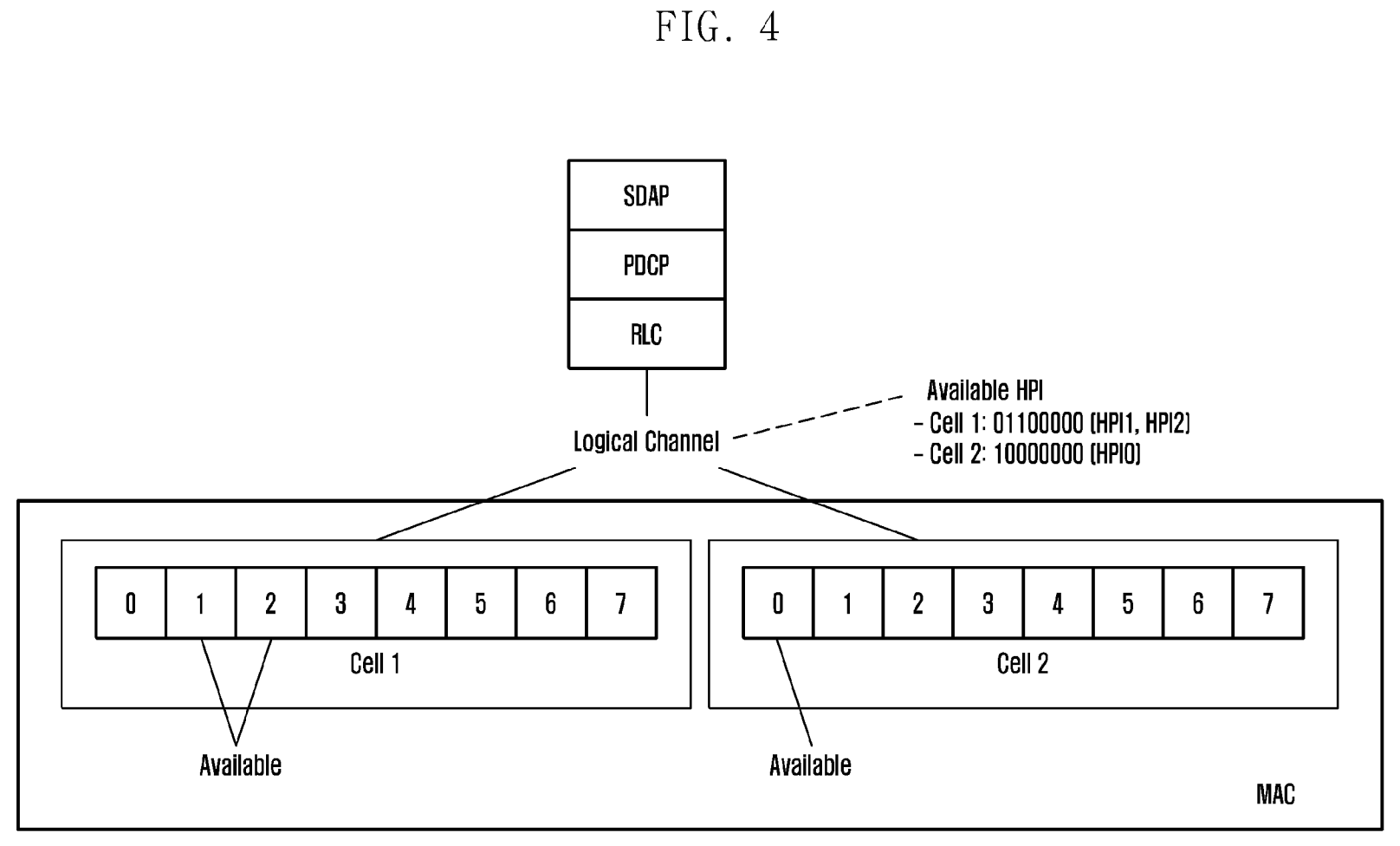

FIG. 4 illustrates a method for applying an LCP restriction according to an embodiment of the disclosure.

In a mobile communication system to which the disclosure may be applied, a radio bearer may be divided into a control signal radio bearer (signaling radio bearer (SRB)) for transmitting control information such as an RRC message or an NAS message, a data radio bearer for transmitting user data, and the like. In addition, the radio bearer may have SDAP, PDCP, and RLC layer devices. The SRB may not have an SDAP device. Each RLC device of the radio bearer may correspond to a MAC device, and the MAC device transmits data in one or more cells. One cell may have several HARQ processes, and the MAC device may transmit or receive a packet for each HARQ process. Referring to FIG. 4, it is shown that, in the embodiment of FIG. 4, cell 1 and cell 2 each have 8 HARQ processes, and each of the HARQ processes has an HARQ process ID (HPI) from 0 to 7. This is only an assumption for convenience of description, and the disclosure is not limited thereto. That is, the number of HARQ processes that each cell has may vary depending on a communication system or a terminal. In addition, different pieces of configuration information may be configured for each radio bearer according to requirements such as a delay and reliability of information transmitted by the radio bearer.

As described above in FIG. 2, since a retransmission delay becomes long in a communication system having a long propagation delay, such as an NTN, performing multiple retransmissions may increase the delay of the information transmitted by the radio bearer. If the information transmitted by the radio bearer requires a short delay, multiple retransmissions already exceed the delay requirement, and thus at the time of receiving the information, the information may amount to information that is no longer needed. On the other hand, when information transmitted by a predetermined radio bearer is valid even in spite of a long delay, multiple retransmissions may be performed to increase the reliability. In such a communication system having a long propagation delay, data transmission may be performed by adjusting the number of retransmissions according to the delay requirement. However, in the case of uplink transmission, the terminal cannot be aware of the number of uplink transmissions configured by a base station. Therefore, the terminal cannot adjust the number of retransmissions or determine whether to perform data transmission according to the number of retransmissions If the base station determines the number of retransmissions for each HARQ process to be used, and the terminal can receive a configuration of an available (allowed) HARQ process for each logical channel from the base station, data may be transmitted through an available HARQ process for each logical channel, and retransmissions of the transmitted data may be performed as long as the delay requirement is satisfied.

To this end, in the embodiment of FIG. 4, a method for configuring an available HARQ process applied to each cell for each logical channel is described. A list of available (allowed) HARQ processes for each cell may be included in a logical channel configuration in an RRC message transmitted by the base station to the terminal. In this case, in order to allow data to be transmitted only through an uplink radio resource of an HARQ process ID included in a list of available HARQ processes of a corresponding cell with respect to a corresponding logical channel, the terminal may perform a logical channel prioritization operation. After performing the logical channel prioritization operation, the terminal may perform uplink transmission by including, in an uplink radio resource, data for a logical channel that ensures a size of resources by which the data can be transmitted.

The embodiment of FIG. 4 shows a method for configuring one list of available (allowed) HARQ processes in one cell. Each cell has an HARQ process ID from 0 (the number of HARQ processes in a cell) to −1, and the ID value may be unique only in a corresponding cell. Therefore, when an available HARQ process is configured in a specific cell, an ID of the available HARQ process may be applied only in the corresponding cell. Accordingly, in the case of carrier aggregation in which multiple cells are configured, it is possible to obtain an advantage of independently operating a cell by configuring an available HARQ process for each different cell. In relation to a logical channel of the embodiment of FIG. 4, it is shown that HARQ processes available in cell 1 are HARQ processes with HPI=1 and HPI=2, and an HARQ process available in cell 2 is an HARQ process with HPI=0. Therefore, with respect to the logical channel, uplink transmission may be performed using uplink radio resources of HARQ processes corresponding to HPI=1 and HPI=2 in cell 1, and uplink transmission may be performed using an uplink radio resource of an HARQ process corresponding to HPI=0 in cell 2. According to another embodiment, when a list of available HARQ processes of a logical channel is not configured, all HARQ processes configured in a corresponding cell may be used for the logical channel.

The embodiment of FIG. 4 shows an embodiment in which a list of available HARQ processes in each cell is expressed in the form of a bitmap having a maximum value size of the number of HARQ processes configured in a cell. That is, since each cell has 8 HARQ processes, the list of available HARQ processes may be expressed as an 8-bit bitmap, and in the case where a value of n ($0 \leq n$ (the number of HARQ processes in a cell)−1)th bit is 1, the case may mean that an HARQ process corresponding to HARQ process ID=n can be used. Conversely, in the case where the value of then ($0 \leq n \leq$ (the number of HARQ processes in a cell)−1)th bit is 0, the case may mean that the HARQ process corresponding to HARQ process ID=n cannot be used. In addition, a cell ID may be used in the configuration to identify for which cell the HARQ process is available.

In another embodiment of the disclosure, instead of such a bitmap, a list of HARQ process IDs available in each cell may be included. For example, in the case of the embodiment of FIG. 4, HPI=1 and 2 may be included in a list of HARQ processes available in cell 1, and HPI=0 may be included in a list of HARQ processes available in cell 2. Even in this case, a cell ID may be used in the configuration to identify for which cell the HARQ process is available.

Figure 5:
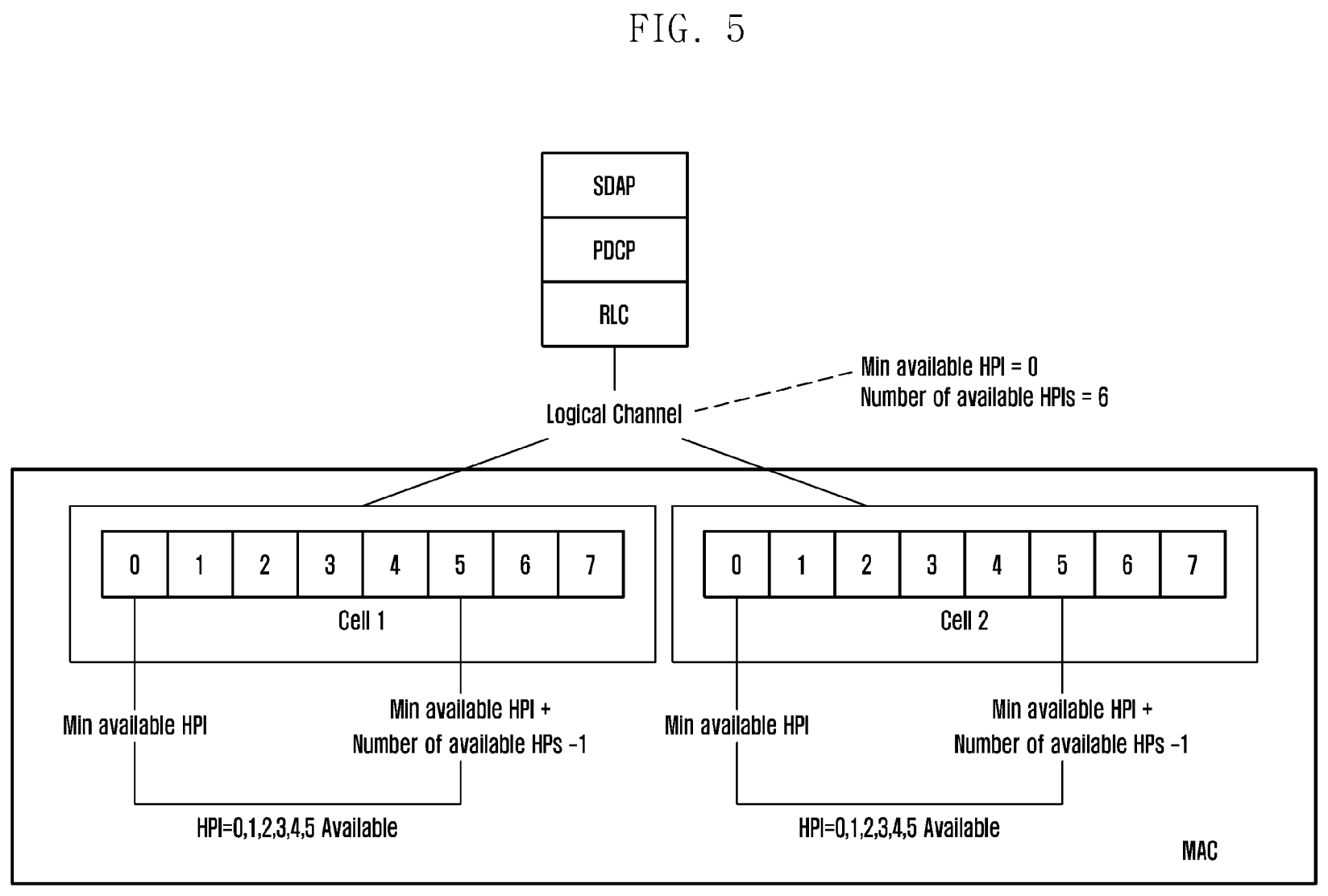

FIG. 5 illustrates a method for applying an LCP restriction according to an embodiment of the disclosure.

In a mobile communication system to which the disclosure may be applied, a radio bearer may be divided into a control signal radio bearer (signaling radio bearer (SRB)) for transmitting control information such as an RRC message or an NAS message, a data radio bearer for transmitting user data, and the like. In addition, the radio bearer may have SDAP, PDCP, and RLC layer devices. The SRB may not have an SDAP device. Each RLC device of the radio bearer may correspond to a MAC device, and the MAC device transmits data in one or more cells. One cell may have several HARQ processes, and the MAC device may transmit or receive a packet for each HARQ process. Referring to FIG. 5, it is shown that, in the embodiment of FIG. 5, cell 1 and cell 2 each have 8 HARQ processes, and each of the HARQ processes has an HARQ process ID (HPI) from 0 to 7. This is only an assumption for convenience of description, and the disclosure is not limited thereto. That is, the number of HARQ processes that each cell has may vary depending on a communication system or a terminal. In addition, different pieces of configuration information may be configured for each radio bearer according to requirements such as a delay and reliability of information transmitted by the radio bearer. As described above in FIG. 2, since a retransmission delay becomes long in a communication system having a long propagation delay, such as an NTN, performing multiple retransmissions may increase the delay of the information transmitted by the radio bearer. If the information transmitted by the radio bearer requires a short delay, multiple retransmissions already exceed the delay requirement, and thus at the time of receiving the information, the information may amount to information that is no longer needed. On the other hand, when information transmitted by a predetermined radio bearer is valid even in spite of a long delay, multiple retransmissions may be performed to increase the reliability. In such a communication system having a long propagation delay, data transmission may be performed by adjusting the number of retransmissions according to the delay requirement. However, in the case of uplink transmission, the terminal cannot be aware of the number of uplink transmissions configured by a base station. Therefore, the terminal cannot adjust the number of retransmissions or determine whether to perform data transmission according to the number of retransmissions. If the base station determines the number of retransmissions for each HARQ process to be used, and the terminal can receive a configuration of an available (allowed) HARQ process for each logical channel from the base station, data may be transmitted through an available HARQ process for each logical channel, and retransmissions of the transmitted data may be performed as long as the delay requirement is satisfied.

To this end, the embodiment of FIG. 5 shows a method for configuring an available HARQ process for each logical channel applied by a MAC device. A list of available (allowed) HARQ processes may be included in a logical channel configuration in an RRC message transmitted by the base station to the terminal. In this case, in order to allow data to be transmitted only through an uplink radio resource of an HARQ process ID included in a list of available HARQ processes with respect to a corresponding logical channel, the terminal may perform a logical channel prioritization operation. After performing the logical channel prioritization operation, the terminal may perform uplink transmission by including, in an uplink radio resource, data for a logical channel that ensures a size of resources by which the data can be transmitted.

The embodiment of FIG. 5 shows a method for configuring one list of available (allowed) HARQ processes in one MAC device. Each cell has an HARQ process ID from 0 (the number of HARQ processes in a cell) to −1, and the ID value may be unique only in a corresponding cell. Therefore, when an available HARQ process is configured in a MAC device, an ID of the available HARQ process may be commonly applied to HARQ processes of cells connected to (or within a cell group) all MAC devices. Accordingly, in the case of carrier aggregation in which multiple cells are configured, an available HARQ process commonly applied in all cells in the MAC device may be configured, and thus an increase in configuration overhead can be prevented. The embodiment of FIG. 5 may show an available HARQ process, based on the lowest offset (min available HPI) of an available HARQ process ID and the number of available HARQ processes. For example, with respect to a logical channel of the embodiment of FIG. 5, the lowest offset (min available HPI) of the available HARQ process ID is configured to be 0 and the number of available HARQ processes is configured to be 6, which may indicate that HARQ processes with HPIs greater than or equal to the lowest offset of available HARQ process IDs and less than or equal to (the lowest offset of available HARQ process IDs)+(the number of available HARQ processes)−1 are available. That is, in the embodiment of FIG. 5, HARQ processes with HPIs=0, 1, 2, 3, 4, and 5 may be used for the corresponding logical channel. Therefore, with respect to the corresponding logical channel, uplink transmission may be performed using uplink radio resources of HARQ processes corresponding to HPIs=0, 1, 2, 3, 4, and 5 of all cells connected to (or within a cell group) the MAC device. According to another embodiment, when a list of available HARQ processes of a predetermined logical channel is not configured, all configured HARQ processes may be used for the corresponding logical channel. In addition, if the lowest offset of an available HARQ process ID is omitted, the lowest offset may be assumed to have a value of 0.

FIG. 6 illustrates a method for applying an LCP restriction according to an embodiment of the disclosure.

In a mobile communication system to which the disclosure may be applied, a radio bearer may be divided into a control signal radio bearer (signaling radio bearer (SRB)) for transmitting control information such as an RRC message or an NAS message, a data radio bearer for transmitting user data, and the like. In addition, the radio bearer may have SDAP, PDCP, and RLC layer devices. The SRB may not have an SDAP device. Each RLC device of the radio bearer may correspond to a MAC device, and the MAC device transmits data in one or more cells. One cell may have several HARQ processes, and the MAC device may transmit or receive a packet for each HARQ process. Referring to FIG. 6, it is shown that, in the embodiment of FIG. 6, cell 1 and cell 2 each have 8 HARQ processes, and each of the HARQ processes has an HARQ process ID (HPI) from 0 to 7. This is only an assumption for convenience of description, and the disclosure is not limited thereto. That is, the number of HARQ processes that each cell has may vary depending on a communication system or a terminal. In addition, different pieces of configuration information may be configured for each radio bearer according to requirements such as a delay and reliability of information transmitted by the radio bearer.

As described above in FIG. 2, since a retransmission delay becomes long in a communication system having a long propagation delay, such as an NTN, performing multiple retransmissions may increase the delay of the information transmitted by the radio bearer. If the information transmitted by the radio bearer requires a short delay, multiple retransmissions already exceed the delay requirement, and thus at the time of receiving the information, the information may amount to information that is no longer needed. On the other hand, when information transmitted by a predetermined radio bearer is valid even in spite of a long delay, multiple retransmissions may be performed to increase the reliability. In such a communication system having a long propagation delay, data transmission may be performed by adjusting the number of retransmissions according to the delay requirement. However, in the case of uplink transmission, the terminal cannot be aware of the number of uplink transmissions configured by a base station. Therefore, the terminal cannot adjust the number of retransmissions or determine whether to perform data transmission according to the number of retransmissions. If the base station determines the number of retransmissions for each HARQ process to be used, and the terminal can receive a configuration of an available (allowed) HARQ process for each logical channel from the base station, data may be transmitted through an available HARQ process for each logical channel, and retransmissions of the transmitted data may be performed as long as the delay requirement is satisfied.

To this end, in the embodiment of FIG. 6, a method for configuring an available HARQ process applied to each cell for each logical channel is described. A list of available (allowed) HARQ processes for each cell may be included in a logical channel configuration in an RRC message transmitted by the base station to the terminal. In this case, in order to allow data to be transmitted only through an uplink radio resource of an HARQ process ID included in a list of available HARQ processes of a corresponding cell with respect to a corresponding logical channel, the terminal may perform a logical channel prioritization operation. After performing the logical channel prioritization operation, the terminal may perform uplink transmission by including, in an uplink radio resource, data for a logical channel that ensures a size of resources by which the data can be transmitted.

The embodiment of FIG. 6 shows a method for configuring one list of available (allowed) HARQ processes in one cell. Each cell has an HARQ process ID from 0 (the number of HARQ processes in a cell) to −1, and the ID value may be unique only in a corresponding cell. Therefore, when an available HARQ process is configured in a specific cell, an ID of the available HARQ process may be applied only in the corresponding cell. Accordingly, in the case of carrier aggregation in which multiple cells are configured, it is possible to obtain an advantage of independently operating a cell by configuring an available HARQ process for each different cell. The embodiment of FIG. 6 may show an available HARQ process, based on the lowest offset (min available HPI) of an available HARQ process ID for each cell and the number of available HARQ processes. For example, with respect to a logical channel of the embodiment of FIG. 6, in cell 1, the lowest offset (min available HPI) of the available HARQ process ID is configured to be 0 and the number of available HARQ processes is configured to be 6, which may indicate that HARQ processes with HPIs greater than or equal to the lowest offset of available HARQ process IDs and less than or equal to (the lowest offset of available HARQ process IDs)+(the number of available HARQ processes)−1 are available. In addition, with respect to the corresponding logical channel, in cell 2, the lowest offset (min available HPI) of the available HARQ process ID is configured to be 6 and the number of available HARQ processes is configured to be 2, which may indicate that HARQ processes with HPIs greater than or equal to the lowest offset of available HARQ process IDs and less than or equal to (the lowest offset of available HARQ process IDs)+(the number of available HARQ processes)−1 are available. That is, in the embodiment of FIG. 6, in cell 1, HARQ processes with HPIs=0, 1, 2, 3, 4, and 5 may be used for the corresponding logical channel, and in cell 2, HARQ processes with HPIs=6 and 7 may be used for the corresponding logical channel. Therefore, in cell 1, with respect to the corresponding logical channel, uplink transmission may be performed using uplink radio resources of HARQ processes corresponding to HPIs=0, 1, 2, 3, 4, and 5, and in cell 2, with respect to the corresponding logical channel, uplink transmission may be performed using uplink radio resources of HARQ processes corresponding to HPIs=6 and 7. According to another embodiment, when a list of available HARQ processes of a logical channel is not configured, all HARQ processes configured in a corresponding cell may be used for the logical channel. In addition, if the lowest offset of an available HARQ process ID is omitted, the lowest offset may be assumed to have a value of 0.

Figure 7:
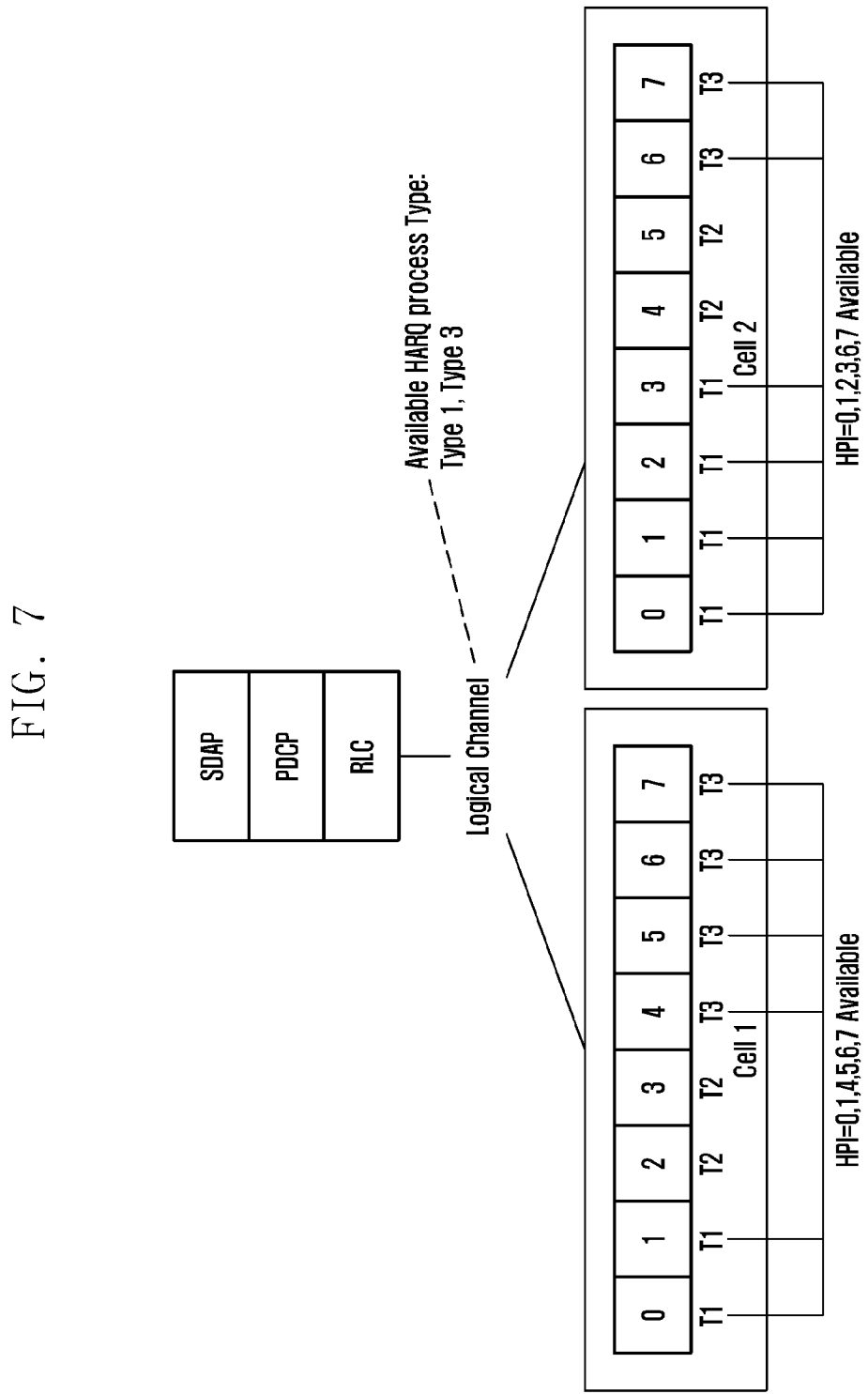
FIG. 7 illustrates a method for applying an LCP restriction according to an embodiment of the disclosure.

FIG. 7 illustrates a method for applying an LCP restriction according to an embodiment of the disclosure.

In a mobile communication system to which the disclosure may be applied, a radio bearer may be divided into a control signal radio bearer (signaling radio bearer (SRB)) for transmitting control information such as an RRC message or an NAS message, a data radio bearer for transmitting user data, and the like. In addition, the radio bearer may have SDAP, PDCP, and RLC layer devices. The SRB may not have an SDAP device. Each RLC device of the radio bearer may correspond to a MAC device, and the MAC device transmits data in one or more cells. One cell may have several HARQ processes, and the MAC device may transmit or receive a packet for each HARQ process. Referring to FIG. 7, it is shown that, in the embodiment of FIG. 7, cell 1 and cell 2 each have 8 HARQ processes, and each of the HARQ processes has an HARQ process ID (HPI) from 0 to 7. This is only an assumption for convenience of description, and the disclosure is not limited thereto. That is, the number of HARQ processes that each cell has may vary depending on a communication system or a terminal. In addition, different pieces of configuration information may be configured for each radio bearer according to requirements such as a delay and reliability of information transmitted by the radio bearer.

As described above in FIG. 2, since a retransmission delay becomes long in a communication system having a long propagation delay, such as an NTN, performing multiple retransmissions may increase the delay of the information transmitted by the radio bearer. If the information transmitted by the radio bearer requires a short delay, multiple retransmissions already exceed the delay requirement, and thus at the time of receiving the information, the information may amount to information that is no longer needed. On the other hand, when information transmitted by a predetermined radio bearer is valid even in spite of a long delay, multiple retransmissions may be performed to increase the reliability. In such a communication system having a long propagation delay, data transmission may be performed by adjusting the number of retransmissions according to the delay requirement. However, in the case of uplink transmission, the terminal cannot be aware of the number of uplink transmissions configured by a base station. Therefore, the terminal cannot adjust the number of retransmissions or determine whether to perform data transmission according to the number of retransmissions. If the base station determines the number of retransmissions for each HARQ process to be used, and the terminal can receive a configuration of an available (allowed) HARQ process for each logical channel from the base station, data may be transmitted through an available HARQ process for each logical channel, and retransmissions of the transmitted data may be performed as long as the delay requirement is satisfied.

To this end, the embodiment of FIG. 7 shows a method for designating an available HARQ process ID through an HARQ process type. In this embodiment, the HARQ process type may include three types of HARQ process types such as Type 1 T1, Type 2 T2, and Type 3 T3. This may be configured through a cell-specific configuration (for example, ServingCellConfig) or a cell group configuration (for example, CellGroupConfig) common to a MAC layer. For example, as shown in FIG. 7, an HARQ process type may be configured for each HARQ process ID of a cell, and the type may be configured through a cell-specific configuration (for example, ServingCellConfig_) or a cell group configuration (for example, CellGroupConfig) common to the MAC layer. In the embodiment of FIG. 7, three HARQ process types are assumed, but this is assumed for convenience of description, and the disclosure is not limited thereto. That is, the number of HARQ process types may vary according to embodiments. An available (allowed) HARQ process type may be included in a logical channel configuration of an RRC message transmitted by the base station to the terminal. In this case, in order to allow data to be transmitted only through an uplink radio resource (uplink grant) of an HARQ process ID corresponding to an available HARQ process type with respect to a corresponding logical channel, the terminal may perform a logical channel prioritization operation. After performing the logical channel prioritization operation, the terminal may perform uplink transmission by including, in an uplink radio resource, data for a logical channel that ensures a size of resources by which the data can be transmitted.

Each cell shown in the embodiment of FIG. 7 has an HARQ process ID from 0 (the number of HARQ processes in a cell) to −1, and the ID value may be unique only in a corresponding cell. Therefore, when an available HARQ process is configured in a MAC device, an ID of the available HARQ process may be commonly applied to HARQ processes of cells connected to (or within a cell group) all MAC devices. Accordingly, in the case of carrier aggregation in which multiple cells are configured, an available HARQ process commonly applied in all cells in the MAC device may be configured, and thus an increase in configuration overhead can be prevented. The embodiment of FIG. 7 may show an available HARQ process, based on an available HARQ process type. For example, it is possible to configure available HARQ process types to be Type 1 and Type 3 with respect to a logical channel of the embodiment of FIG. 7, so as to indicate that an HARQ process corresponding to a corresponding type is an available HARQ process. That is, in cell 1 of the embodiment of FIG. 7, with respect to the corresponding logical channel, uplink transmission may be performed using uplink radio resources of HARQ processes corresponding to HPIs=0, 1, 4, 5, 6, and 7. In addition, in cell 2, with respect to the corresponding logical channel, uplink transmission may be performed using uplink radio resources of HARQ processes corresponding to HPIs=0, 1, 2, 3, 6, and 7. According to another embodiment, when an available HARQ process type of a logical channel is not configured, all HARQ processes configured in a corresponding cell may be used for the logical channel.

Figure 8:
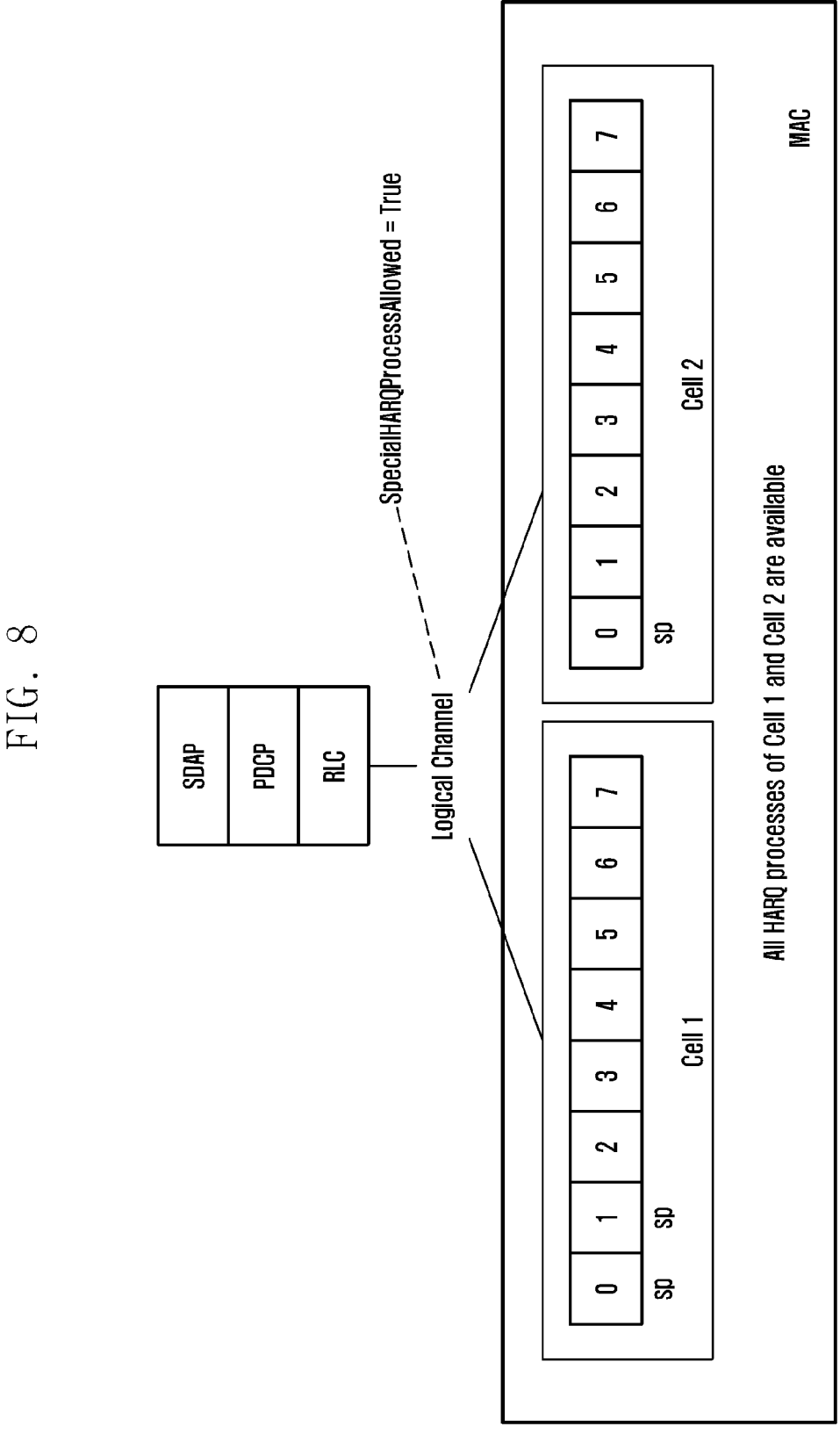
FIG. 8 illustrates a method for applying an LCP restriction according to an embodiment of the disclosure.

FIG. 8 illustrates a method for applying an LCP restriction according to an embodiment of the disclosure.

In a mobile communication system to which the disclosure may be applied, a radio bearer may be divided into a control signal radio bearer (signaling radio bearer (SRB)) for transmitting control information such as an RRC message or an NAS message, a data radio bearer for transmitting user data, and the like. In addition, the radio bearer may have SDAP, PDCP, and RLC layer devices. The SRB may not have an SDAP device. Each RLC device of the radio bearer may correspond to a MAC device, and the MAC device transmits data in one or more cells. One cell may have several HARQ processes, and the MAC device may transmit or receive a packet for each HARQ process. Referring to FIG. 8, it is shown that, in the embodiment of FIG. 8, cell 1 and cell 2 each have 8 HARQ processes, and each of the HARQ processes has an HARQ process ID (HPI) from 0 to 7. This is only an assumption for convenience of description, and the disclosure is not limited thereto. That is, the number of HARQ processes that each cell has may vary depending on a communication system or a terminal. In addition, different pieces of configuration information may be configured for each radio bearer according to requirements such as a delay and reliability of information transmitted by the radio bearer.

As described above in FIG. 2, since a retransmission delay becomes long in a communication system having a long propagation delay, such as an NTN, performing multiple retransmissions may increase the delay of the information transmitted by the radio bearer. If the information transmitted by the radio bearer requires a short delay, multiple retransmissions already exceed the delay requirement, and thus at the time of receiving the information, the information may amount to information that is no longer needed. On the other hand, when information transmitted by a predetermined radio bearer is valid even in spite of a long delay, multiple retransmissions may be performed to increase the reliability. In such a communication system having a long propagation delay, data transmission may be performed by adjusting the number of retransmissions according to the delay requirement. However, in the case of uplink transmission, the terminal cannot be aware of the number of uplink transmissions configured by a base station. Therefore, the terminal cannot adjust the number of retransmissions or determine whether to perform data transmission according to the number of retransmissions. If the base station determines the number of retransmissions for each HARQ process to be used, and the terminal can receive a configuration of an available (allowed) HARQ process for each logical channel from the base station, data may be transmitted through an available HARQ process for each logical channel, and retransmissions of the transmitted data may be performed as long as the delay requirement is satisfied.

To this end, the embodiment of FIG. 8 shows a method for designating an HARQ process of a separate group. In the embodiment of FIG. 8, an HARQ process of a separate group may be referred to as a special HARQ process. Which HARQ process is a special HARQ process for each cell or each cell group may be configured for the terminal. If cells in a cell group have the same HARQ process ID of a special HARQ process in common, the base station may inform the terminal of the special HARQ process by configuring an ID of the special HARQ process in a cell group configuration. In contrast, when each cell has an HARQ process ID of a special HARQ process, the base station may inform the terminal of the special HARQ process by configuring an ID of the special HARQ process in a cell configuration. In the embodiment of FIG. 8, it is assumed that each cell has an HARQ process ID of a special HARQ process differently. HARQ processes with HPIs=0 and 1 in cell 1 and an HARQ process with HPI=0 in cell 2 are designated as special HARQ processes. This is only an assumption for convenience of description, and the disclosure is not limited thereto.

As mentioned above, whether a special HARQ process can be used for a logical channel may be configured. A configuration value indicating whether a special HARQ process can be used for a logical channel may be included in a logical channel configuration in an RRC message transmitted by the base station to the terminal. When a special HARQ process is configured to be available for a logical channel, in order to allow data to be transmitted through an uplink radio resource (uplink grant) allocated to a special HARQ process with respect to the corresponding logical channel, the terminal may perform a logical channel prioritization operation. After performing the logical channel prioritization operation, the terminal may perform uplink transmission by including, in an uplink radio resource, data for a logical channel that ensures a size of resources by which the data can be transmitted. An HARQ process other than a special HARQ process may be used for the corresponding logical channel. For example, a special HARQ process is configured to be available for a logical channel of the embodiment of FIG. 8 (for example, SpecialHARQProcessAllowed=True), the special HARQ process and all HARQ processes of cell 1 and cell 2 which are not configured as the special HARQ process may be used for the corresponding logical channel. Alternately, when a special HARQ process is not configured to be available for a logical channel (for example, SpecialHARQProcessAllowed=False), in cell 1, HARQ processes corresponding to HPIs=2, 3, 4, 5, 6, and 7 may be used for the corresponding logical channel, and in cell 2, HARQ processes corresponding to HPIs=1, 2, 3, 4, 5, 6, and 7 may be used for the corresponding logical channel.

Figure 9:
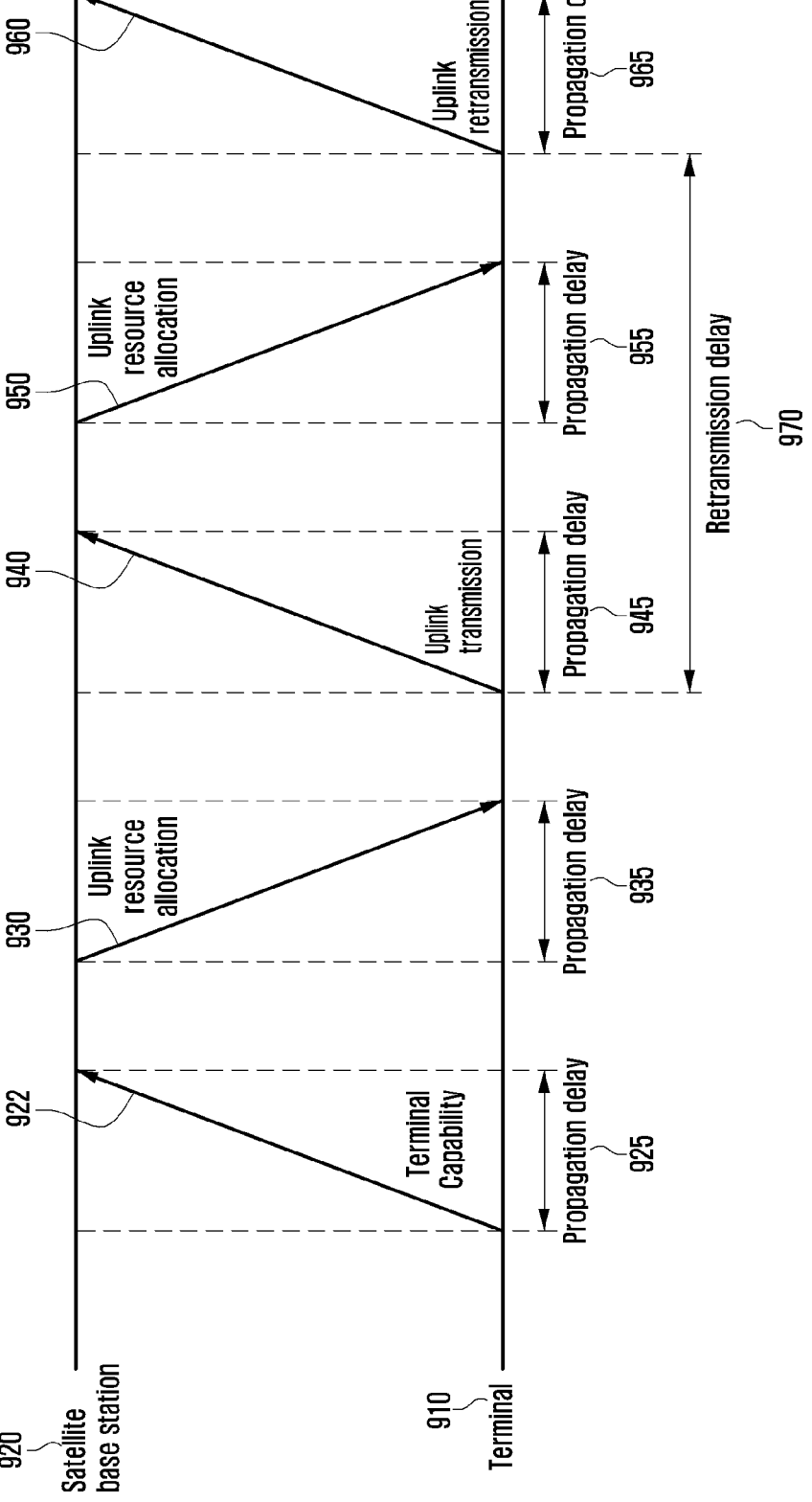
FIG. 9 illustrates an example of indicating uplink retransmission based on terminal capability in an NTN according to an embodiment of the disclosure.

FIG. 9 illustrates an example of indicating uplink retransmission based on terminal capability in an NTN according to an embodiment of the disclosure.

In an NTN, the time required for data transmission becomes long due to a long propagation delay 970. The time may be several times an RTT according to the number of retransmissions. In this case, continuous data transmission may not be performed with respect to the limited number of HARQ processes configured in a terminal 910. On the other hand, having an infinite number of HARQ processes by the terminal 910 has a limitation due to practical limitation such as a memory problem. Therefore, the terminal 910 may report the number of HARQ processes which can be used in each cell to a base station 920 through a terminal capability message (922). The terminal capability message may include the number of HARQ processes commonly supported in each cell by the terminal 910 or the number of HARQ processes supported for each cell by the terminal. Since the terminal capability message also follows general data transmission of the NTN, the message may arrive at the base station 920 after experiencing a propagation delay 925. The base station 920 having received the terminal capability message allocates an uplink resource to the terminal 910, based on information in the message (930), and allows uplink transmission 940 and retransmission 960 to be performed. According to various embodiments of the disclosure described above, it is possible to configure an available HARQ process for a logical channel by considering propagation delays 925, 935, 945, 955, and 965, and thus a more efficient communication system can be implemented.

Figure 10:
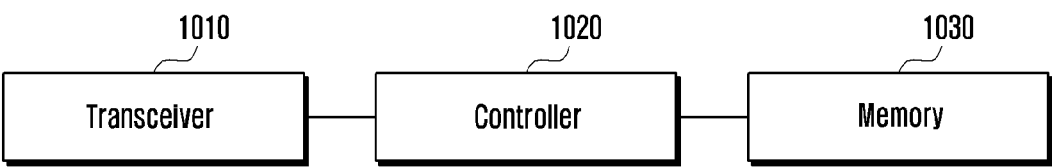
FIG. 10 illustrates a structure of a terminal according to an embodiment of the disclosure.

FIG. 10 illustrates a structure of a terminal according to an embodiment of the disclosure.

Figure 11:
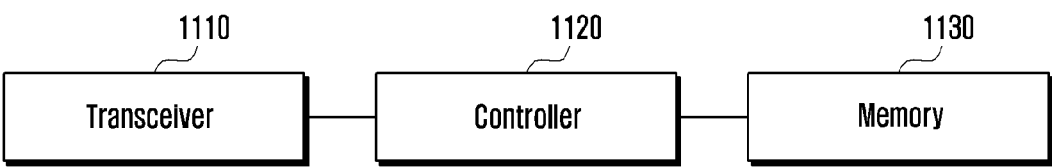
FIG. 11 illustrates a structure of a base station according to an embodiment of the disclosure.

Referring to FIG. 10, a terminal may include a transceiver 1010, a controller 1020, and a memory 1030. In the disclosure, the controller may be defined as a circuit, an application-specific integrated circuit, or at least one processor. The transceiver 1010 may transmit or receive a signal to or from other network entities. For example, the transceiver 1010 may receive system information from a base station, and may receive a synchronization signal or a reference signal. The controller 1020 may control the overall operation of the terminal according to the embodiments proposed in the disclosure. For example, the controller 1020 may control a signal flow between blocks so as to perform an operation according to the above-described flowchart. The memory 1030 may store at least one of information transmitted or received via the transceiver 1010 and information generated via the controller 1020. FIG. 11 illustrates a structure of a base station according to an embodiment of the disclosure.

Referring to FIG. 11, a base station may include a transceiver 1110, a controller 1120, and a memory 1130. In the disclosure, the controller 1120 may be defined as a circuit or an application-specific integrated circuit, or at least one processor. The transceiver 1110 may transmit or receive a signal to or from other network entities. For example, the transceiver 1110 may transmit system information to a terminal, and may transmit a synchronization signal or a reference signal. The controller 1120 may control the overall operation of the base station according to the embodiments proposed in the disclosure. For example, the controller 1120 may control a signal flow between blocks so as to perform an operation according to the above-described flowchart. The memory 1130 may store at least one of information transmitted or received via the transceiver 1110 and information generated via the controller 1120.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

Furthermore, the methods of the disclosure described above in FIGS. 1 to 11 may include methods in which one or more of the drawings are combined according to various implementations.

The invention claimed is:

1. A method of a terminal in a communication system, the method comprising:

receiving, from a base station, a radio resource control (RRC) message including configuration information on a logical channel and configuration information on a serving cell including information on a hybrid automatic repeat request (HARQ) type corresponding to HARQ process identifier (ID) of the serving cell;

identifying an uplink grant associated with the HARQ process ID;

if an allowed HARQ type for the logical channel is configured by the configuration information on the logical channel, selecting the logical channel allowed to use the HARQ type corresponding to the HARQ process ID, for logical channel prioritization, based on the information; and transmitting, to the base station, uplink data of the selected logical channel based on the uplink grant, wherein, if the allowed HARQ type for the logical channel is not configured by the configuration information on the logical channel, all HARQ processes of the serving cell are used for the logical channel without HARQ type restriction.

2. The method of claim 1, further comprising:

allocating a resource for the uplink grant based on the logical channel prioritization, wherein the uplink data is transmitted in the allocated resource.

3. The method of claim 2, wherein the uplink grant is identified based on downlink control information (DCI) received from the base station.

4. The method of claim 1, wherein the allowed HARQ type is either a first mode or a second mode.

5. A method of a base station in a communication system, the method comprising:

transmitting, to a terminal, a radio resource control (RRC) message including configuration information on a logical channel and configuration information on a serving cell including information on a hybrid automatic repeat request (HARQ) type corresponding to HARQ process identifier (ID) of the serving cell; and if an allowed HARQ type for the logical channel is configured by the configuration information on the logical channel, receiving, from the terminal, uplink data of a selected logical channel based on an uplink grant associated with the HARQ process ID, wherein the selected logical channel is allowed to use the HARQ type corresponding to the HARQ process ID, for logical channel prioritization, based on the information, and wherein, if the allowed HARQ type for the logical channel is not configured by the configuration information on the logical channel, all HARQ processes of the serving cell are used for the logical channel without HARQ type restriction.

6. The method of claim 5, wherein the uplink data is received in a resource, allocated based on the logical channel prioritization, for the uplink grant.

7. The method of claim 6, wherein the uplink grant is identified based on downlink control information (DCI) transmitted to the terminal.

8. The method of claim 5, wherein the allowed HARQ type is either a first mode or a second mode.

9. A terminal of a communication system, the terminal comprising:

a transceiver; and a controller connected to the transceiver and configured to:

receive, from a base station, a radio resource control (RRC) message including configuration information on a logical channel and configuration information on a serving cell including information on a hybrid automatic repeat request (HARQ) type corresponding to HARQ process identifier (ID) of the serving cell, identify an uplink grant associated with the HARQ process ID, if an allowed HARQ type for the logical channel is configured by the configuration information on the logical channel, select the logical channel allowed to use the HARQ type corresponding to the HARQ process ID, for logical channel prioritization, based on the information, and transmit, to the base station, uplink data of the selected logical channel based on the uplink grant, wherein, if the allowed HARQ type for the logical channel is not configured by the configuration information on the logical channel, all HARQ processes of the serving cell are used for the logical channel without HARQ type restriction.

10. The terminal of claim 9, wherein the controller is further configured to allocate a resource for the uplink grant with regard to data based on the logical channel prioritization, and wherein the uplink data is transmitted in the allocated resource.

11. The terminal of claim 10, wherein the uplink grant is identified based on downlink control information (DCI) received from the base station.

12. The terminal of claim 9, wherein the allowed HARQ type is either a first mode or a second mode.

13. A base station of a communication system, the base station comprising:

a transceiver; and a controller connected to the transceiver and configured to:

transmit, to a terminal, a radio resource control (RRC) message including configuration information on a logical channel and configuration information on a serving cell including information on a hybrid automatic repeat request (HARQ) type corresponding to HARQ process identifier (ID) of the serving cell, and if an allowed HARQ type for the logical channel is configured by the configuration information on the logical channel, receive, from the terminal, uplink data of a selected logical channel based on an uplink grant associated with the HARQ process ID, wherein the selected logical channel is allowed to use the HARQ type corresponding to the HARQ process ID, for logical channel prioritization, based on the information, and wherein, if the allowed HARQ type for the logical channel is not configured by the configuration information on the logical channel, all HARQ processes of the serving cell are used for the logical channel without HARQ type restriction.

14. The base station of claim 13, wherein the uplink data is received in a resource, allocated based on the logical channel prioritization, for the uplink grant.

15. The base station of claim 14, wherein the uplink grant is identified based on downlink control information (DCI) transmitted to the terminal.

16. The base station of claim 13, wherein the allowed HARQ type is either a first mode or a second mode.

* * * * *